(12) United States Patent
Dolar et al.

(10) Patent No.: US 10,287,743 B1
(45) Date of Patent: *May 14, 2019

(54) PIPE TRENCH SYSTEM

(71) Applicant: ADProducts, LLC, Spokane, WA (US)

(72) Inventors: Ronald E. Dolar, Spokane, WA (US); Dan C. Cummings, Spokane, WA (US); Russell D. Marshall, Spokane, WA (US); Bobby G. Head, Rathdrum, ID (US); Timothy W. Bardell, Sunnyside, WA (US); Steven M. Albrecht, Sunnyside, WA (US)

(73) Assignee: ADProducts, LLC, Spokane, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/242,181

(22) Filed: Jan. 8, 2019

Related U.S. Application Data (63) Continuation of application No. 15/222,892, filed on Jul. 28, 2016, now Pat. No. 10,208,448.

(51) Int. Cl.
| | | |
|---|---|---|
| *E02D 29/00* | (2006.01) | |
| *F16L 3/26* | (2006.01) | |
| *G01M 3/04* | (2006.01) | |
| *G01M 3/28* | (2006.01) | |

(52) U.S. Cl.
CPC .......... *E02D 29/10* (2013.01); *F16L 3/26* (2013.01); *G01M 3/28* (2013.01); *E02D 2600/10* (2013.01)

(58) Field of Classification Search
CPC ....... F16L 1/06; F16L 1/11; F16L 3/00; F16L 3/22; F16L 3/223–227; F16L 3/23; F16L 3/26; F16L 2201/30; E02D 29/10; E02D 2600/10; G01M 3/28–2846; G01F 23/48; G01F 23/50

USPC .............. 405/154.1, 157, 184.4; 4/488–513
See application file for complete search history.

(56) References Cited

U.S. PATENT DOCUMENTS

| | | | |
|---|---|---|---|
| 1,794,815 | A | 3/1931 | Wlit |
| 3,065,635 | A | 11/1962 | Keller |
| 3,490,081 | A | 1/1970 | Ogden |
| 3,596,296 | A | 8/1971 | Gertz et al. |
| 3,739,405 | A | 6/1973 | Schmidt |
| 3,829,911 | A | 8/1974 | Bishop |
| 4,653,958 | A | 3/1987 | Anderson et al. |
| 4,899,963 | A | 2/1990 | Murphy |
| 4,968,179 | A | 11/1990 | Frahm |
| 8,967,191 | B1 | 3/2015 | DeVerse et al. |
| 2009/0031902 | A1 | 2/2009 | White et al. |

OTHER PUBLICATIONS

Office Action for U.S. Appl. No. 15/222,892, dated Jun. 29, 2018, Dolar, "Pipe Trench System" 13 pages.

*Primary Examiner* — Benjamin F Fiorello
*Assistant Examiner* — Stacy N Lawson
(74) *Attorney, Agent, or Firm* — Lee & Hayes, P.C.

(57) ABSTRACT

Systems for providing pipe trenching, and methods of installing the same, are disclosed. Methods of detecting one or more leaks in a pipe trench system and repairing those leaks are also disclosed. The systems may include one or more housings, which may include a trench portion, a lid, a gasket, and one or more leak detectors. The leak detectors may provide a visual indication of a leak in the one or more housings. The leak may be accurately detected, inspected, and repaired without demolition of decking material, excavation of dirt, or damage to the system or surrounding decking material.

20 Claims, 11 Drawing Sheets

PIPE TRENCH SYSTEM

RELATED APPLICATIONS

This application claims priority to and is a continuation of U.S. patent application Ser. No. 15/222,892, filed on Jul. 28, 2016, the entire contents of which are incorporated herein by reference.

BACKGROUND

Swimming pools, and other aquatic recreation facilities, generally require a piping system to bring water to and take water from the main water body. In a pool, for example, a series of pipes connect to the pool to support equipment such as pumps, filters, and heaters. In both indoor and outdoor applications, this piping system is typically placed below ground for functional and aesthetic reasons. These pipes are traditionally embedded in soil or other backfill material and then covered with a hard durable decking such as concrete.

Unfortunately, the piping systems described above can fail. Some pipe failures result in small leaks that are not easily detected until the leaked water causes problems to the pool or surrounding structures, such as the foundation of a home. Even when leaks are apparent, it is typically difficult to determine where the leak is because the leaked water dissipates downward into the ground and does not present visual signs on the surface of the pool or surrounding area. Certain companies advertise the ability to survey the piping system and determine the general location of a leak, but they typically do so with damage to the decking material surrounding the pool and without a guarantee that the leak will be accurately detected. In any event, even if the leak is accurately detected, repair typically entails demolition of the decking material (e.g., concrete, tile, etc.) around the pool, excavation of the piping system, repair of the system, backfill, compaction, and repaving of the decking material. In most applications, to avoid unsightly patch work of repaired decking, the entirety of the decking material around the pool is replaced.

As such, the piping systems described above suffer from several drawbacks. For example, leaks are not easily detected, and even if a leak is apparent, finding its location is costly and often damages the decking material. Additionally, the piping systems described above are not easily replaced or fixed given that they are buried beneath fill material and decking material.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The apparatuses depicted in the accompanying figures are not to scale and components within the figures may be depicted not to scale with each other.

DETAILED DESCRIPTION

Overview

This disclosure describes example systems for pipe trenching, and methods of installation, leak detection, and repair of such systems.

The pipe trench systems described herein maintain accessibility to pipes within the trench system. The pipe trench system offers a leak detector to proximate the leak location. When pipe failures are detected, the pipe trench system may include easily removable covers to directly expose the pipes for closer inspection without cutting or otherwise destroying original decking. After the pipes are repaired, the covers may be easily re-installed, eliminating the need for costly efforts to backfill and compact the pipe bedding, and restoring of the original decking. Thus, some of the advantages of using the presently disclosed pipe trench system include but are not limited to easier identification and location of pipe failures, reduced time to execute pipe repairs, and cost savings of repairing or replacing original deck surfaces.

In one example, the system may include a housing that includes a trench portion and a lid shaped to cover the trench portion. The system may also include a gasket that may be positioned between at least a portion of the lid and at least a portion of the trench portion. The gasket may be positioned and designed to provide a substantially water-tight seal between the lid and the trench portion. The system may further include a leak detector that may be positioned at least partially in the lid. The leak detector may include a float positioned in a lower half of the trench portion, a helical shaft that may be coupled to the float, and an indicator compartment that may be coupled to the helical shaft and the lid. The system described herein may provide for an easily installed system that has accurate and low-cost leak detection capabilities. The system described herein may also provide for easy visual inspection and repair of pipes detected as leaking by, for example, easy removal of the lid from the trench portion. Furthermore, the system described herein may provide for an aesthetically pleasing pipe encasement means when installed.

In another embodiment, the system may include a plurality of housings, each of which may include a trench portion and a lid shaped to cover the trench portion. A gasket, similar to the one described above, may also be included to provide a substantially water-tight seal between the lid and the trench portion of each of the plurality of housings. The plurality of housings may take on a number of shapes. By way of example, at least one housing of the plurality of housings may be substantially straight and may be used, for example, along a straight side of the pool to which the pipe trench system is installed for. By way of further example, at least one housing of the plurality of housings may be at least partially bent, whether at a 90 degree angle or any other angle, and may be used, for example, on a corner of the pool to which the pipe trench system is installed for. By way of further example, at least one housing of the plurality of housings may be configured as a three-way junction and may be used, for example, to connect piping in the shape of a "T" and/or to house a leak detector. By way of further example, at least one housing of the plurality of housings may be configured as a four-way junction and may be used, for example, to connect piping in the shape of a cross-intersection and/or to house a leak detector. By so doing, the system described herein may provide a series of interconnected housings that may partially or completely surround a pool and provide a piping system to bring water to and take water from the pool.

In a further embodiment, the system may include a housing that includes a trench portion and a lid shaped to cover the trench portion. A gasket, similar to the one described above, may also be included to provide a substantially water-tight seal between the lid and the trench portion. The lid may include a pan, which may be configured to receive one or more decking materials. For example, the pan may be configured to receive concrete, which may match the concrete that lines or surrounds the pool. The pan may also be configured to receive other decking materials, such as metal, tiling, ceramic, pavers, or a combination thereof. The lid may include a connection means to the trench portion, such as, for example, corrosion resistant screws, clips, tongue-in-groove fasteners, clamps, etc. By so doing, the system described herein may provide a pipe trenching system that is easily installed and removed and that provides for an aesthetically pleasing cover to the pipe trench system.

In yet another embodiment, a method of installing the system described herein may include placing one or more trench portions, each of which includes a gasket, at least partially into the ground proximate to the pool. As used herein, proximate means within a working distance from the pool. By way of example, proximate to the pool may include between the pool and the incoming water source. The one or more trench portions may be placed in a manner that allows pipes to be placed therein to bring water to the pool and drain water from the pool as recommended by the pool manufacturer or as known to someone having skill in the art of pool installation. The one or more trench portions may be connected through any of various fastening means, such as for example, corrosion resistant screws, clips, tongue-in-groove fasteners, clamps, etc. Piping may be installed in the connected trench portions. The piping may be in contact with one or more pipe clips located on an interior lower surface of each trench portion. A lid matching each of the trench portions may then be placed on the trench portions. The lids may be removably coupled to the trench portions by, for example, corrosion resistant screws, clips, tongue-in-groove fasteners, clamps, etc. One or more of the lids may contain a leak detector, which may include a float portion positioned in a lower half of the trench portion, a helical shaft coupled to the float, and an indicator compartment coupled to the helical shaft and the lid. By so doing, the piping system may be installed without the need for soil or other material to bury the piping and without the need to cover the soil with decking material (e.g., concrete, tiling, etc.).

In yet another embodiment, a method of detecting a leak in the system described herein may include viewing one or more leak detectors positioned in at least one lid of the housings. In addition, or alternatively, an electronic notification indicating a leak may be sent to a computing device. The one or more leak detectors may include a float positioned in a lower half of a trench portion of the housings, a helical shaft coupled to the float, and an indicator compartment coupled to the helical shaft and the lid. The indicator compartment may include a viewing portion having a first side that may be substantially transparent and a second side that may be substantially opaque. The indicator compartment may further include a rotatable dial with a first portion that provides a visual indication that a threshold amount of water is present within the housing and a second portion that provides a visual indication that a threshold amount of water is not present within the housing. The rotatable dial may be in contact with the helical shaft such that, as water fills the interior bottom portion of the trench portion, the float is pushed upward and rotates the helical shaft. The rotatable dial rotates with the helical shaft such that the first portion of the rotatable dial becomes visible through the first side of the viewing portion of the indicator compartment. The method of detecting a leak may also include removing the lid corresponding to the section(s) where the leak detector indicates a leak. The lid may be removed without damage to the pipe trench system, surrounding decking material, or pool. The method may further include visually inspecting the pipes within the trench portion without damage to the pipe trench system, surrounding decking material, or pool. By so doing, leaks may be detected in the piping system in a low-cost, accurate manner without damaging the system or its surroundings.

In yet another embodiment, a method of repairing a leak in the system described herein may include identifying a location of a leak in at least one pipe installed within at least one housing. Identifying the location of the leak may include visually viewing one or more leak detectors positioned in at least one lid of one or more housings. The one or more leak detectors may include a float positioned in a lower half of a trench portion of the housings, a helical shaft coupled to the float, and an indicator compartment coupled to the helical shaft and the lid. The indicator compartment may include a viewing portion having a first side that may be substantially transparent and a second side that may be substantially opaque. The indicator compartment may further include a rotatable dial with a first portion that provides a visual indication that a threshold amount of water is present within the housing and a second portion that provides a visual indication that a threshold amount of water is not present within the housing. The rotatable dial may be in contact with the helical shaft such that, as water fills the interior bottom portion of the trench portion, the float is pushed upward and rotates the helical shaft. The rotatable dial rotates with the helical shaft such that the first portion of the rotatable dial becomes visible through the first side of the viewing portion of the indicator compartment. The method of repairing a leak in the system further includes removing the lid without damage to the pipe trench system, decking material, or pool.

The method further includes removing a damaged portion of the pipe within the trench portion or a damaged connector between pipes and replacing the damaged portion with an undamaged portion. The method also includes re-installing the lid with, for example, corrosion resistant screws, clips, tongue-in-groove fasteners, clamps, etc. By so doing, leaking pipes and/or connections can be repaired without the need to demolish and replace the decking material.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

Example Pipe Trench Systems

Figure 1:
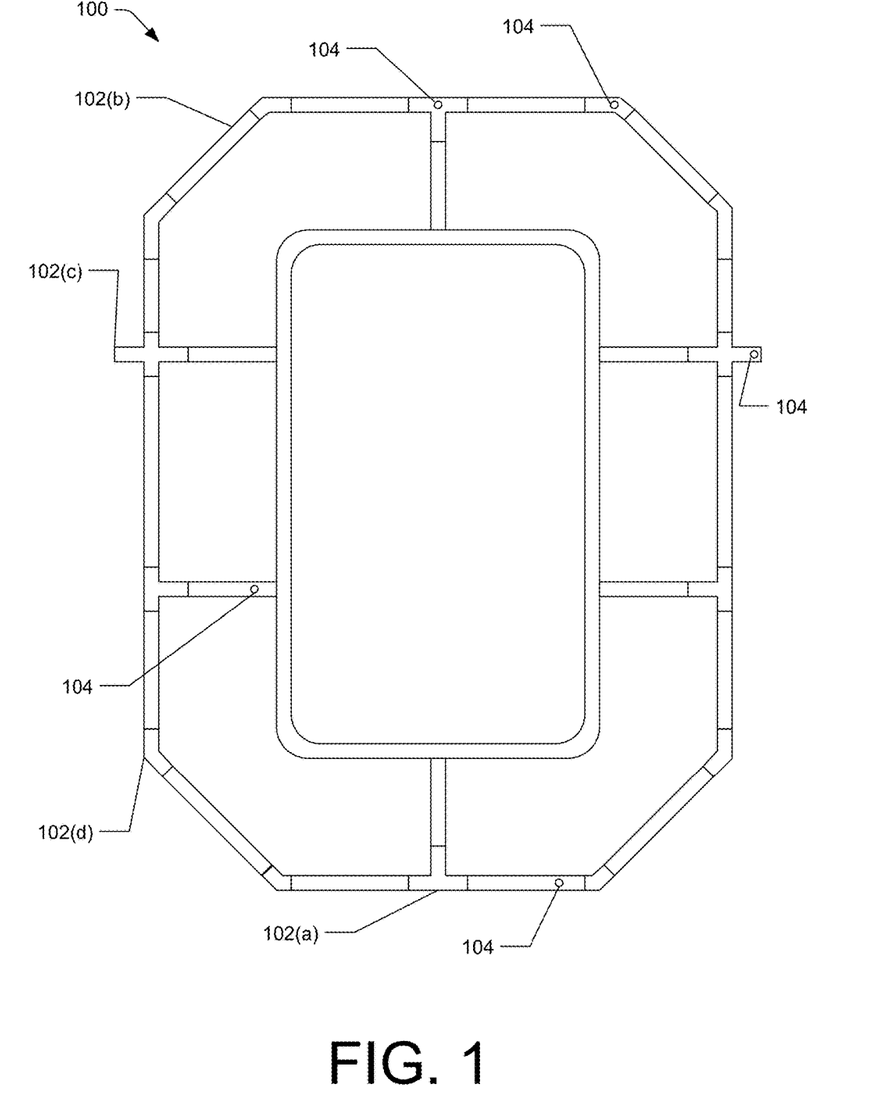
FIG. 1 illustrates a top schematic view of an embodiment of a pipe trench system.

FIG. 1 illustrates an example of a pipe trench system (100). System 100 may include one or more housings 102(a)-(d). As shown in FIG. 1, system 100 comprises a plurality of housings 102(a)-(d) arranged around a pool. The housings 102(a)-(d) may be configured to couple to each other and define a pool trench system. The housings 102 may be configured to receive one or more pipes that function to carry water to and from the pool. Each of the housings 102(a)-(d) may be of various lengths depending on the purpose for the specific housing and the size and shape of the pool. One or more of the housings 102(a)-(d) may also include a leak detector 104. The leak detector 104 may provide a visual indication that a threshold amount of water is present in the housing containing the leak detector 104, where the threshold amount indicates a leak.

Figure 2:
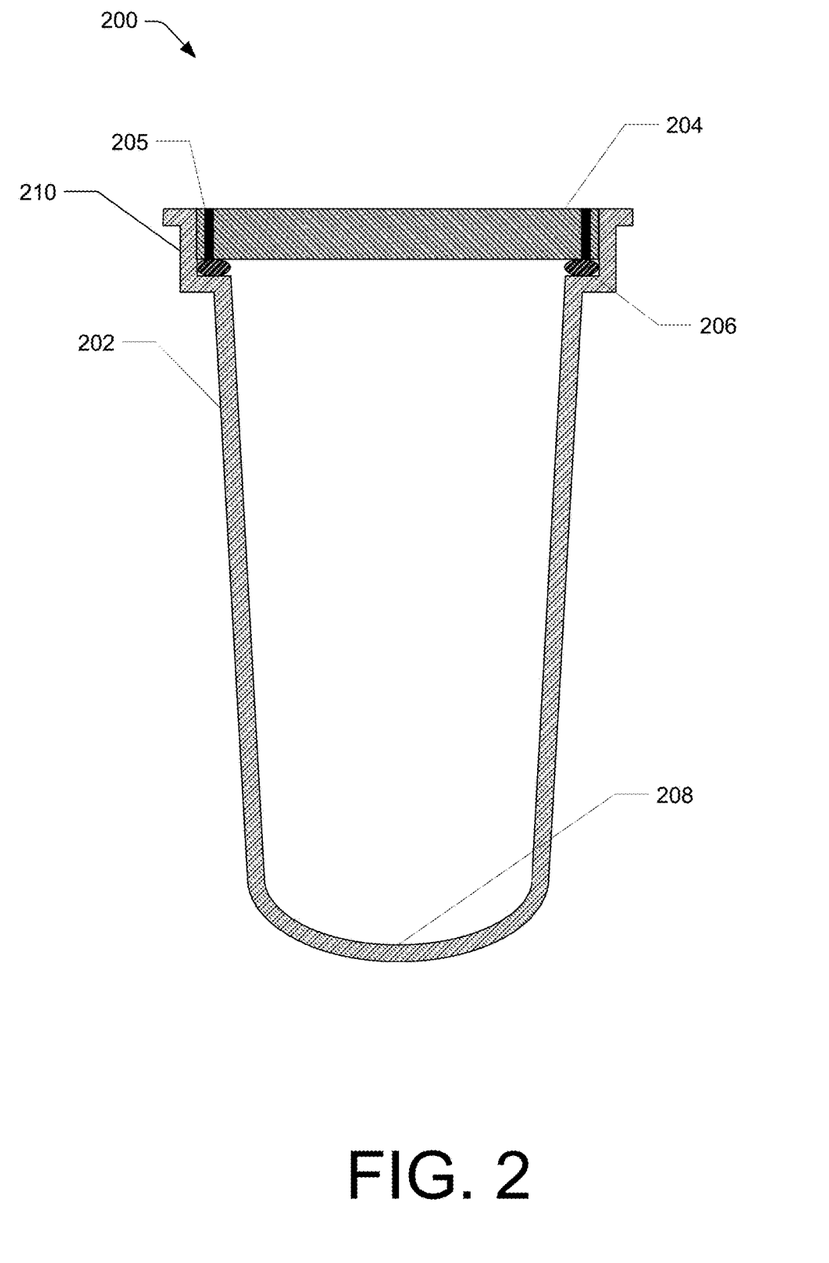
FIG. 2 illustrates a side, cross-sectional schematic view of an embodiment of a pipe trench system.

FIG. 2 illustrates a side, cross-sectional schematic view of an embodiment of a housing 200 from system 100, for example. The housing 200 may include a trench portion 202 and a lid 204 shaped to cover the trench portion 202. The lid 204 may be fastened to the trench portion 202 by, for example, corrosion resistant screws, clips, tongue-in-groove fasteners, clamps, etc. (collectively referred to as a fastener 205). In other examples, the weight of the lid 204 may be sufficient to arrest unwanted movement of the lid 204. A gasket 206 may be positioned between at least a portion of the lid 204 and at least a portion of the trench portion 202. The gasket 206 may be positioned to provide a substantially water-tight seal between the lid 204 and the trench portion 202. As used herein, substantially water-tight means that under ambient environmental conditions water does not pass between the lid 204 and the trench portion 202 as a stream or as droplets; however, condensation or non-continuous water may be present. The gasket 206 may be made of, for example, expanded rubber. Additional gaskets 206 may be placed between lids 204 when multiple housings 202 are coupled together. The trench portion 202 may have an interior lower surface 208 that may be at least partially curved. The curvature may concentrate unwanted fluid leakage for more accurate leak detection and identification of repair needs.

In examples, the trench portion 202 may be between approximately 1 inch and approximately 48 inches from the lid 204 to the interior lower surface 208 of the trench portion 202. In other examples, the trench portion 202 may be between approximately 5 inches and approximately 40 inches from the lid 204 to the interior lower surface 208 of the trench portion 202. In other examples, the trench portion 202 may be between approximately 10 inches and approximately 30 inches from the lid 204 to the interior lower surface 208 of the trench portion 202. In other examples, the trench portion 202 may be between approximately 10 inches and approximately 20 inches from the lid 204 to the interior lower surface 208 of the trench portion 202.

In other examples, the height of the trench portion 202 may vary depending on the geographic location that the system will be installed in and the application for which the pipes installed therein serve. By way of example, for an outdoor pool application in the Pacific Northwest where temperatures may drop below freezing, the height of the trench portion 202 may be greater than an indoor, climate-controlled pool application or an outdoor pool application in the Southeastern United States where temperatures are more moderate.

In examples, the width of the trench portion 202 may be between approximately 1 inch and approximately 20 inches. In other examples, the width of the trench portion 202 may be between approximately 5 inches and approximately 15 inches. In other examples, the width of the trench portion 202 may be between approximately 5 inches and approximately 10 inches. In other examples, the width of the trench portion 202 may be between approximately 7 inches and approximately 9 inches. The side walls of the trench portion 202 may be parallel to each other or have tapering, as shown in FIG. 2.

The trench portion 202 of the housing 200 may be constructed of a material suitable for the environment in which installation occurs. In some instances, materials such as metal, polymer, fiberglass, etc., or any combination thereof may be used to construct the trench portion 202. Additionally, the trench portion 202 may have one or more coatings or linings on the interior and/or exterior to restrict and/or prevent permeation of water into and/or out of the housing 200.

The housing 200 may also include a ledge 210 on the trench portion 202. The ledge 210 may hold or otherwise allow the gasket 206 to rest on the trench portion 202. The ledge 210 may also provide a stoppage point for the lid 204 when coupled to the trench portion 202. The ledge 210 may also assist in holding the trench portion 202 in a desired position in the ground.

In examples, the length of housing 200 may be between approximately 5 inches and approximately 100 inches, or more. In other examples, the length of housing 200 may be between approximately 10 inches and approximately 50 inches. In other examples, the length of housing 200 may be between approximately 20 inches and approximately 30 inches.

Figure 3:
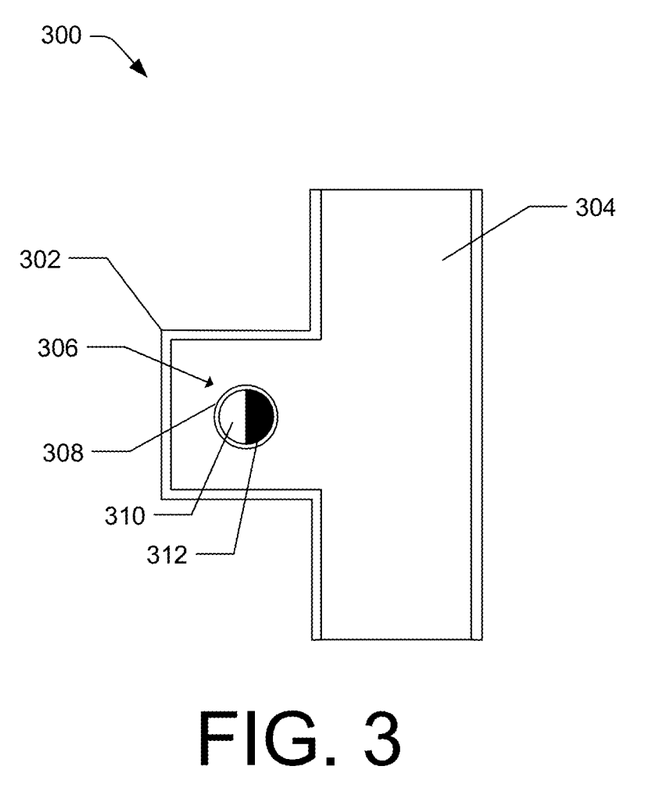
FIG. 3 illustrates a top schematic view of an embodiment of a portion of a pipe trench system with a leak detector.

FIG. 3 illustrates a top schematic view of an embodiment of a housing 300 from system 100, for example. The housing 300 may include the same or similar features as those shown in FIG. 2. For example, the housing 300 may include a trench portion 302 and a lid 304. The housing 300 may also include a leak detector 306 positioned, for example, at least partially in the lid 304. The leak detector 306 may include an indicator compartment 308 that may be coupled to the lid 304. The indicator compartment 308 may include a viewing portion having a first side 310 and a second side 312. The first side 310 of the viewing portion may be substantially transparent or may otherwise allow a person looking at the first side 310 to see through the first side 310 and into the trench portion 302. The second side 312 of the viewing portion may be substantially opaque or may otherwise prevent a person looking at the second side 312 from seeing through the second side 312. The shape of the indicator compartment 308 may vary, but, by way of example, FIG. 3 shows a circular indicator compartment 308.

The leak detector 306 in FIG. 3 is depicted in one arm of a three-way junction housing 300. However, the leak detector 306 may be placed anywhere on the lid 304 of the housing 300. Additionally, more than one leak detector may be placed on a lid, and one or more leak detectors may be placed on any housing, whether that housing is straight, bent, a three-way junction, a four-way junction, or otherwise.

Figure 4:
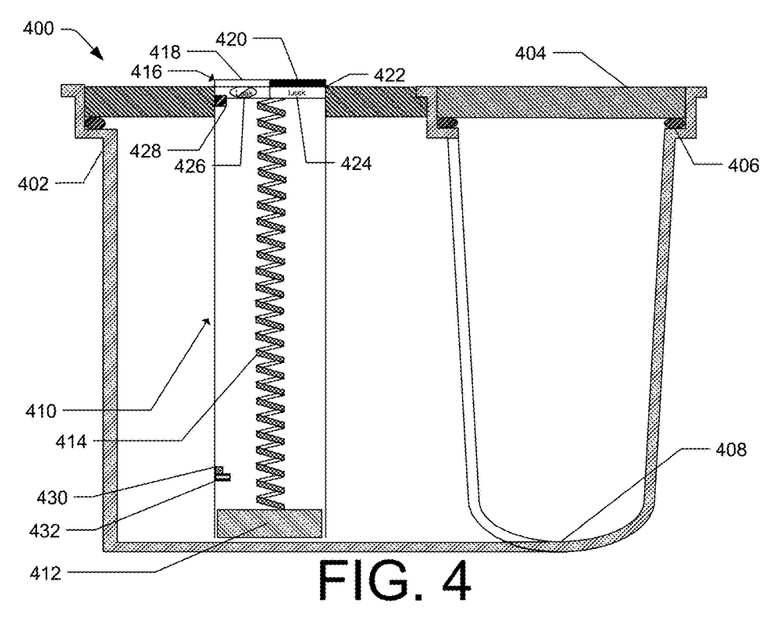
FIG. 4 illustrates a side, cross-sectional schematic view of an embodiment of a pipe trench system with a leak detector.

FIG. 4 illustrates a side, cross-sectional schematic view of an embodiment of a housing 400 from system 100, for example. In the example in FIG. 4, the housing 400 is a three-way junction housing, much like the one shown in FIG. 3, with the cross-section taken midway through the junction. The housing 400 may contain the same or similar components to those in FIG. 2 and FIG. 3. For example, the housing 400 in FIG. 4 may contain a trench portion 402, a lid 404, a gasket 406, an interior lower surface 408 of the trench portion 402, and a leak detector 410. FIG. 4 provides additional details about an example embodiment of the leak detector 410. In examples, the leak detector 410 may include a float 412 that may be positioned in a lower half of the trench portion 402. The float 412 may be constructed of a buoyant material that allows the float 412 to float as water rises within the trench portion 402. The float 412 may be coupled to a helical shaft 414. The helical shaft 414 may be configured to rotate as the float 412 rises within the trench portion 402. An indicator compartment 416 may be coupled to the helical shaft 414 opposite the float 412.

The indicator compartment 416 may have the same or similar components as the indicator compartment 308 from FIG. 3. For example, the indicator compartment 416 may include a viewing portion having a first side 418 and a second side 420. The first side 418 of the viewing portion may be substantially transparent or may otherwise allow a person looking at the first side 418 to see through the first side 418. The second side 420 of the viewing portion may be substantially opaque or may otherwise prevent a person looking at the second side 420 from seeing through the second side 420.

The indicator compartment 416 may also include a rotatable dial 422 that may be in contact with the helical shaft 414. The rotatable dial 422 may have a first portion 424 that may provide a visual indication, when viewed through the first side 418 of the viewing portion, that a threshold amount of water is present within the housing 400. The rotatable dial 422 may also have a second portion 426 that may provide a visual indication, when viewed through the first side 418 of the viewing portion, that the threshold amount of water is not present within the housing 400. As shown in FIG. 4, the first portion 424 of the rotatable dial 422 may have a visual indication that includes at least a word or a symbol indicating the threshold amount of water is present. By way of example, the visual indication may be the word "leak." Likewise, the second portion 426 of the rotatable dial 422 may have a visual indication that includes at least a word or a symbol indicating the threshold amount of water is not present. By way of example, the visual indication may be the word "leak" with a slash through it. It should be noted that the specific words and/or symbols used in this disclosure are provided only as examples of visual indications and not by way of limitation. Any words and/or symbols may be used.

The leak detector 410 may also include a stop notch 428 positioned proximate to the rotatable dial 422. The stop notch 428 may restrict or prohibit rotation of the rotatable dial when the first portion 424 is viewable through the first side 418 of the viewing portion. In use, the rotatable dial 422, when the threshold amount of water is not present in the housing 400, is in a resting position wherein the second portion 426 is viewable through the first side 416 of the viewing portion. The first portion 426 is hidden by the substantially opaque second side 420 of the viewing portion. In this configuration, the leak detector 410 provides a visual indication that no leak is present in the pipes or connectors within the housing 400.

However, as a pipe or connector leaks and water fills the trench portion 402 of the housing 400, the float 412 rises and the helical shaft 414 rotates. The rotating helical shaft 414 may rotate the rotatable dial 422 until the first portion 424 is viewable through the first side 418 of the viewing portion and the second portion 426 is hidden by the substantially opaque second side 420 of the viewing portion. In this configuration, the leak detector 410 provides a visual indication that a leak is present in the pipes or connectors within the housing 400. When the rotatable dial 422 rotates to a point where the first portion 424 is substantially completely viewable through the first side 418, the stop notch 428 engages the rotatable dial 422 and holds it in place, preventing the rotatable dial 422 from further rotation. The stop notch 428 allows someone viewing the leak detector 410 to see that a leak event occurred even if the water within the trench portion 402 subsided and/or evaporated. By so doing, the leak detector 410 provides an indication of a leak event that should be investigated even when the event was temporary or otherwise latent. The stop notch 428 may be reset once the leak has been investigated.

The leak detector 410 may include a number of additional components that aid in its operation. Those components may include, for example, a float well that houses all or a portion of the components of the leak detector 410 and provides for an area within which the float 412 is maintained. Additional components may include retaining screws, retaining nuts, o-rings, an indicator foundation, one or more base rings, a vent hole in the float well, helix bushings, and/or a float retaining pin to hold the float 412 to the helical shaft 414. The float well may restrain the float 512 from rotation and may cause the float 512 to impart torque and lift to the helical shaft 514.

The leak detector 410 may also include a sensor 430 that may electronically detect when the threshold amount of water is present in the trench portion 402. A transceiver 432 or other electronic communication device may be in electronic communication with the sensor 430 and may receive a signal from the sensor indicating that the threshold amount of water is present in the trench portion 402. The transceiver 432 may transmit, through wired or wireless communication, a notification to a computing device. The notification may indicate that the threshold amount of water is present. The notification may also indicate one of more of the following regarding the leak event: the time; the date; the strength of signal from the sensor; a confidence that the leak event occurred; a location within the system where the leak occurred; a history of leak events at the triggered leak detector; or a history of leak events at other leak detectors in the system.

Figure 5:
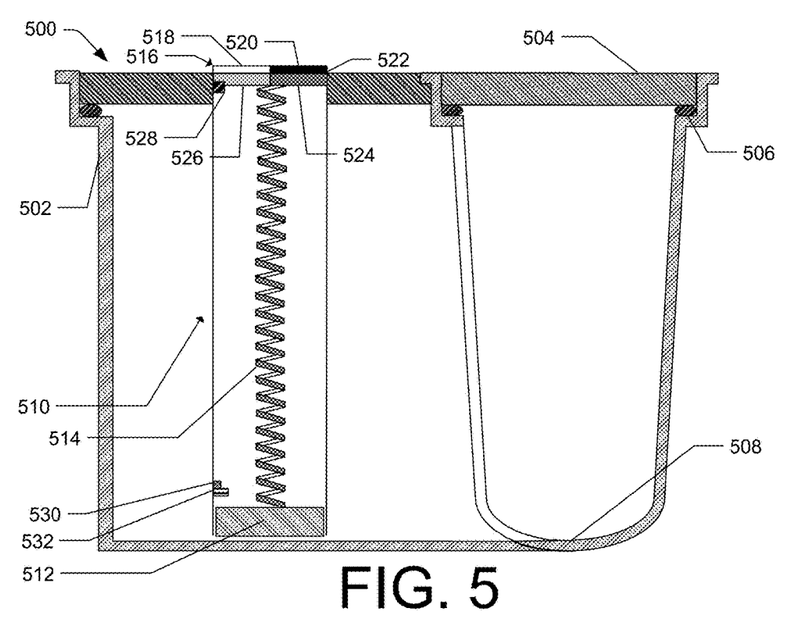
FIG. 5 illustrates a side, cross-sectional schematic view of another embodiment of a pipe trench system with a leak detector.

FIG. 5 illustrates a side, cross-sectional schematic view of an embodiment of a housing 500 from system 100, for example. In the example in FIG. 5, the housing 500 is a three-way junction housing, much like the one shown in FIG. 4, with the cross-section taken midway through the junction. The housing 500 from FIG. 5 may have the same or similar components as those in FIG. 4. For example, the housing 500 may include a trench portion 502, a lid 504, a gasket 506, an interior lower surface 508 of the trench portion 502, a leak detector 510, a float 512, a helical shaft 514, an indicator compartment 516, a first side 518 of a viewing portion of the indicator compartment 516, a second side 520 of a viewing portion of the indicator compartment 516, a rotatable dial 522, a first portion 524 of the rotatable dial 522, a second portion 526 of the rotatable dial 522, a stop notch 528, a sensor 530, and a transceiver 532.

The first portion 524 of the rotatable dial 522 may provide a visual indication that a threshold amount of water is present within the housing 500. The visual indication may be a first color. The second portion 526 of the rotatable dial 522 may provide a visual indication that a threshold amount of water is not present within the housing 500. The visual indication may be a second color. By way of example, the color of the first portion 524 may be red or another color that inherently catches the eye of someone within a certain distance of the pipe trench system. The color of the second portion 526, to the contrary, may be a color other than red, and may be a color that matches the color of the lid 502 and/or may be a color that is not eye catching.

Figure 6A:
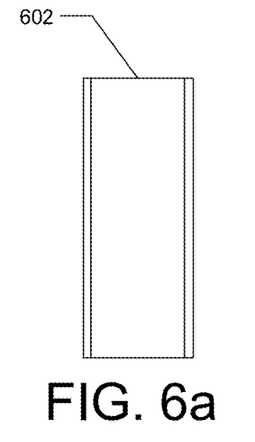
FIG. 6a illustrates a top schematic view of a substantially straight portion of an embodiment of a portion of a pipe trench system.
Figures 6B, 6C:
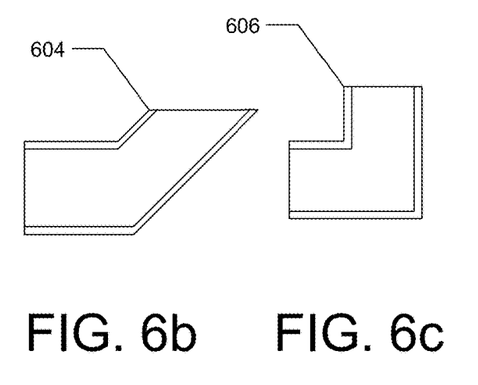
FIG. 6b illustrates a top schematic view of a bent portion of an embodiment of a portion of a pipe trench system.
FIG. 6c illustrates a top schematic view of a bent portion of another embodiment of a portion of a pipe trench system.
Figure 6D:
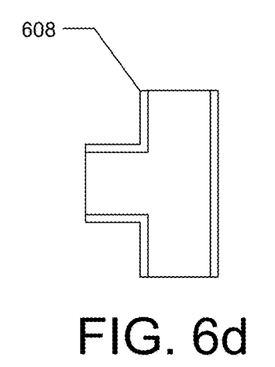
FIG. 6d illustrates a top schematic view of a three-way junction portion of an embodiment of a portion of a pipe trench system.
Figure 6E:
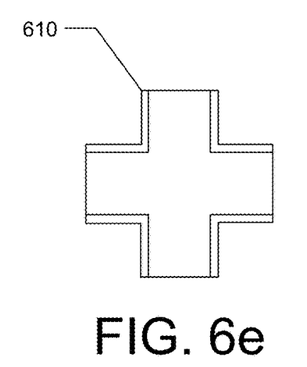
FIG. 6e illustrates a top schematic view of a four-way junction portion of an embodiment of a portion of a pipe trench system.

FIGS. 6a-6e illustrate top schematic views of various housing configurations. For example, FIG. 6a depicts a substantially straight housing 602. The housing 602 may be used to house pipes with minimal to no bend or junctions. FIG. 6b depicts a bent housing 604. The housing 604 may be used as a connector between two substantially straight housings 602 where an angle other than 90 degrees is desired. FIG. 6c depicts a 90 degree bent housing 606. The housing 606 may be used as a connector between two substantially straight housings 602, for example, where an angle of 90 degrees is desired. FIG. 6d depicts a three-way junction housing 608. The housing 608 may be used as a connector between pipes that intersect to form a "T" or to provide a portion to fit a leak detector. FIG. 6e depicts a four-way junction housing 610. The housing 610 may be used as a connector between pipes that intersect to form a cross-intersection, or as a connector between pipes that intersect to form a "T" and to provide a portion to fit a leak detector. The housings depicted in FIGS. 6a-6e are by way of example and are not exhaustive. Example systems described herein may have only one, some, or all of the housings shown in FIGS. 6a-6e. Additional custom configurations are also disclosed to provide for pipes that have non-straight segments, pipes that have changes in elevation, and pipes that are connected with uncommon connection means.

The three-way junction housing 608 and/or the four-way junction housing 610 may have a depth that is deeper than, for example, housing 602, particularly when the housing 608 and/or the housing 610 includes a leak detector. The deeper housing may act as a collection sump for the leak detectors.

Figure 7:
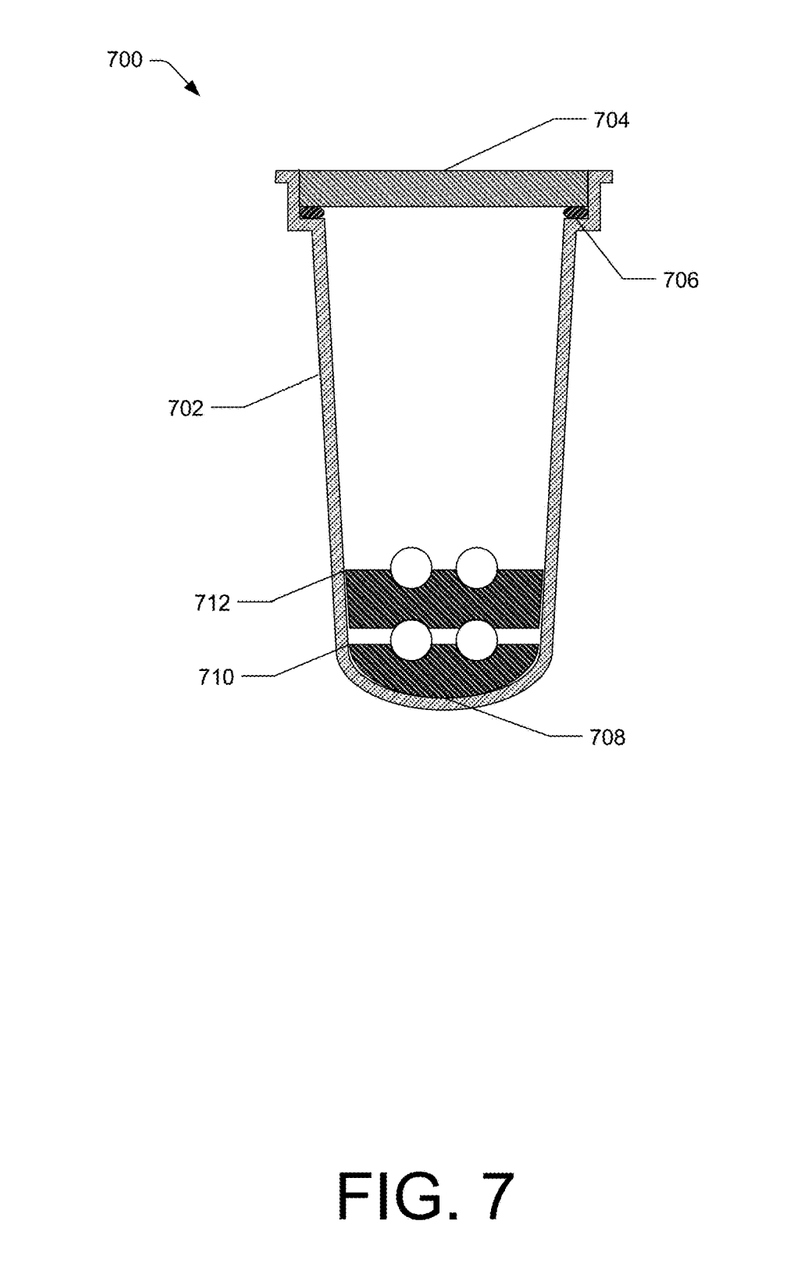
FIG. 7 illustrates a side, cross-sectional schematic view of an embodiment of a portion of a pipe trench system with pipe clips.

FIG. 7 illustrates a side, cross-sectional schematic view of an embodiment of a housing 700 from system 100, for example. The housing 700 may include the same or similar features as those found in FIG. 2. For example, the housing 700 in FIG. 7 may include a trench portion 702, a lid 704, a gasket 706, and an interior lower surface 708. The housing 700 in FIG. 7 may also include a first pipe clip 710 that may be positioned on or near the interior lower surface 708. The first pipe clip 710 may be sized to conform to the interior lower surface 708 and may cradle at least one pipe situated within the housing 700. The sizing of the first pipe clip 710 may vary depending on the number and size of the pipes situated within the housing 700. The number of first pipe clips 710 may also vary depending on the application. For example, if the housing 700 is a long, straight segment, 2, 3, 4, 5, or more first pipe clips 710 may be used. If the housing 700 is a short segment, no first pipe clips 710 or only one first pipe clip may be used.

The housing 700 may also include a second pipe clip 712 that may be positioned between a first layer of pipe and a second layer of pipe within the housing 700. The second pipe clip 712 may be sized to cradle pipes of the first layer of pipe and pipes of the second layer of pipe. In examples, the number of second pipe clips 712 may vary along with the size of the second pipe clips 712.

Figure 8:
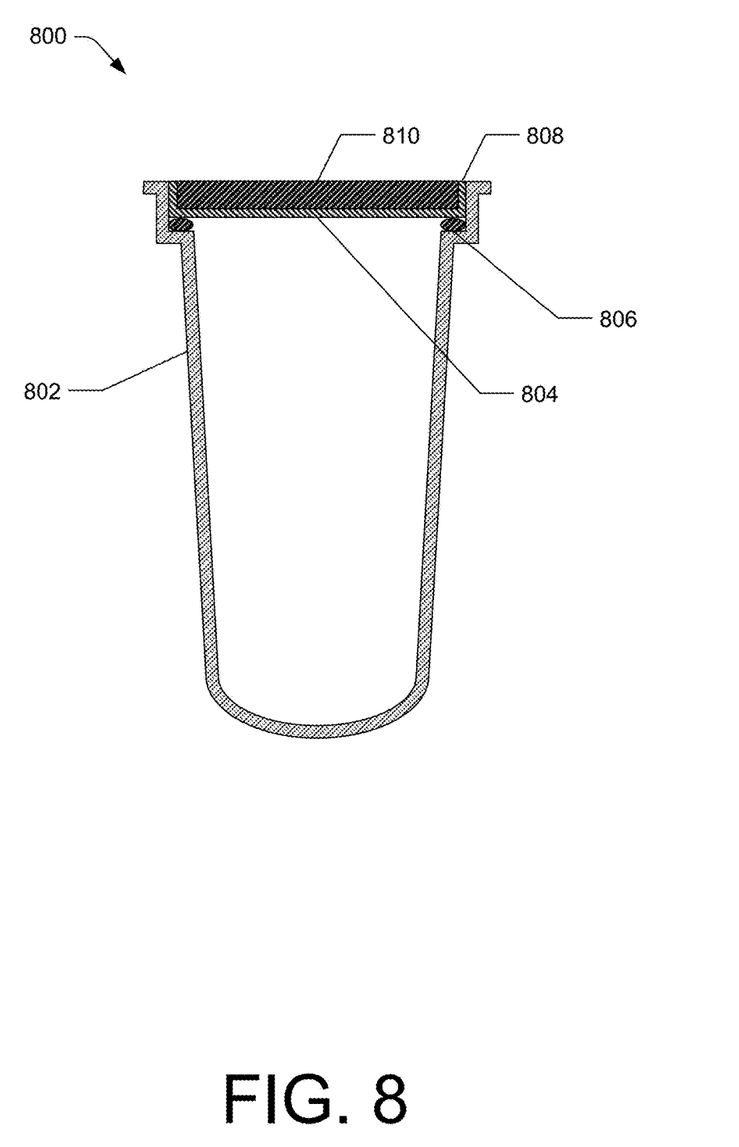
FIG. 8 illustrates a side, cross-sectional schematic view of an embodiment of a portion of a pipe trench system with a pan situated in the lid.

FIG. 8 illustrates a side, cross-sectional schematic view of an embodiment of a housing 800 from system 100, for example. The housing 800 may include the same or similar features to those found in FIG. 2. For example, the housing 800 in FIG. 8 may include a trench portion 802, a lid 804, and a gasket 806. The lid 804 may also include a pan 808. The pan 808 may be filled with decking material 810. The decking material 810 may be, for example, concrete, polymeric resin, ceramic, metal, a combination thereof, or composites thereof. The decking material 810 may also be any material that matches or substantially matches the material making up the pool or the area surrounding the pool. By so doing, the lid 804 may be designed to provide visually aesthetic qualities to the pipe trench system.

The components described above in the present disclosure and as shown in FIGS. 1-8 may be separate components coupled together, or may be produced as one component or as combined components. For example, referring to FIG. 4, the rotatable dial 422 and the indicator compartment 516 may be separate components or one component. When the various components described in the present disclosure are separate components, some or all of the components may be releaseably coupled to the other components.

The components of the systems described herein may be of varying sizes and scales. For example, a pipe trench system designed for residential application may be of a smaller size and scale than a pipe trench system designed for commercial applications.

The components of the presently disclosed systems may be made of one or more of various materials, including but not limited to metal and/or plastic. When made of metal, the components may be made of any metal with suitable strength and malleability to create the components described herein. The various components of the systems disclosed herein may have additional grooves, slots, indentations, and other components to facilitate the function of the components as described herein.

The various components of the systems disclosed herein may be made using techniques known to those having skill in the art of metal working, including, for example, by welding, tacking, and metal bending or shaping. When made of polymeric materials, the various components of the systems disclosed herein may be made using techniques known to those having skill in the art of polymer forming and/or sintering, including, for example, extrusion, blow molding, and/or rotational molding. The systems may be installed in a residential or commercial space, whether indoors or outdoors. Additional installation of components as may be required by government codes or regulations may also be performed.

The systems described herein, in practice, show a dramatic decrease in the cost of pipe leak detection, removal of damaged pipe, and repair of damaged pipe.

While the various examples used herein describe detection of leaking pipes, damage to other systems, such as electrical systems and wiring, is also disclosed herein. Additionally, while the various examples used herein are with respect to a pool, other bodies of water, such as spas, hot tubs, Jacuzzis, and steam rooms, for example, are disclosed. Other exemplary uses are, for example, sewage systems, potable water inlet and outlets, cable and power supplies, etc.

The system may also include components typically found in pool piping systems, such as, for example, skimmers, return jets, caps, screens, screen baskets, ledgers, flanges, doors (such as wave doors), jet direction balls, and drain plugs. These components may be modified to fit and act with the present system. For example, the skimmers may have outlets that are higher than typical skimmer assemblies, which may enable the skimmer pipe to connect directly without creating lengths of trapped water. By way of further example, dead ends may be closed with end plates. Additionally, some housings, as described above, may be installed for aesthetic or supplemental use purposes and may not, when installed, include pipes.

While a number of measurements described herein are in inches, other or additional units of measurement, such as the metric system, that are substantial equivalents are also disclosed.

Exemplary Method of Installation

Figure 9:
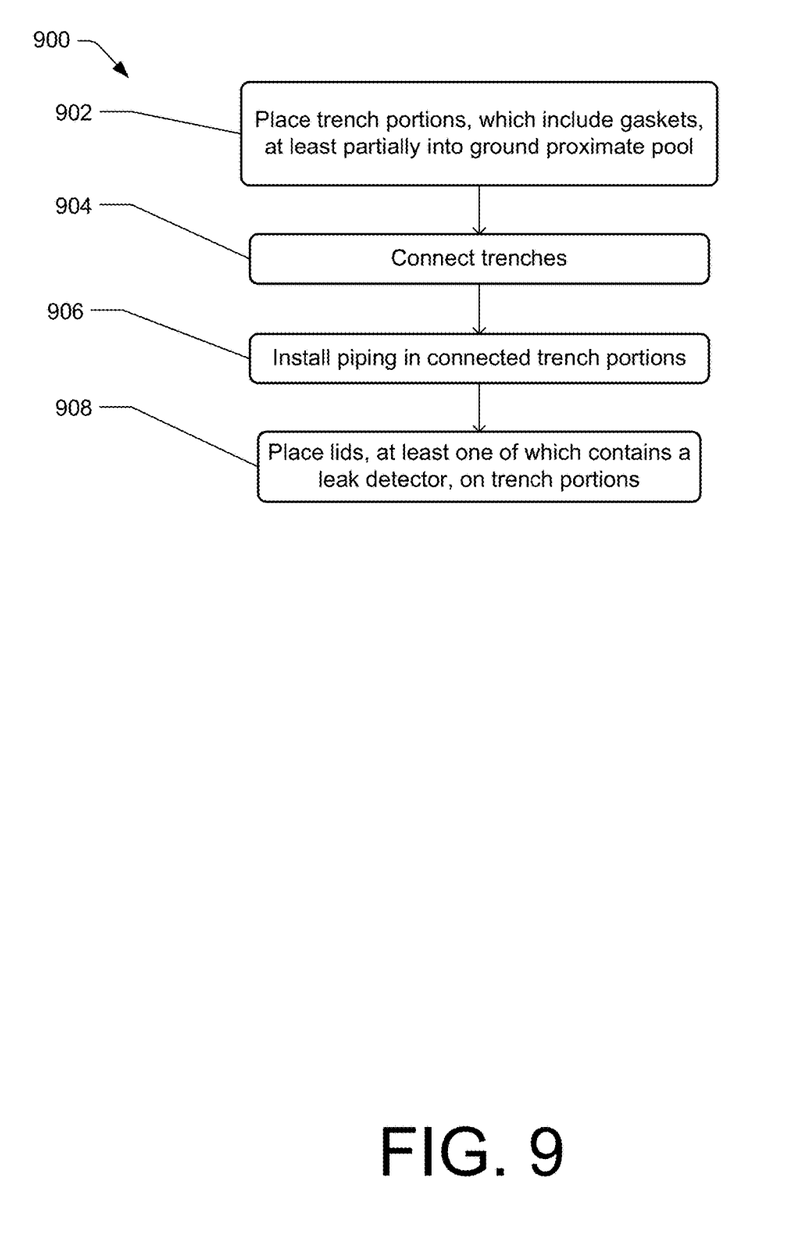
FIG. 9 illustrates a flow diagram of a method of installing an embodiment of a pipe trench system.

FIG. 9 illustrates an example method for installation of a piping system. Method 900 is illustrated as a logical flow graph. The order in which the operations or steps are described is not intended to be construed as a limitation, and any number of the described operations may be combined in any order and/or in parallel to implement method 900.

Turning now to FIG. 9, there is illustrated an exemplary method 900 of installing a piping system.

At block 902, method 900 includes placing one or more trench portions, one or more of which may include a gasket, at least partially into the ground proximate to a pool. In some examples, the ground around the pool area may be excavated before or during installation to provide a rough estimate of where the trench portions are to be placed. The trench portions may be placed such that a ledge of the trench portions is substantially at ground level. The one or more trench portions may be placed in a manner that allows piping to be installed to flow water to the pool and drain from the pool as recommended by the pool manufacturer or as known to someone having skill in the art of pool installation.

At block 904, the one or more trench portions may be connected through any of various fastening means, such as, for example, corrosion resistant screws, clips, tongue-in-groove fasteners, clamps, etc. The connection may provide a substantially water-tight barrier between the interior and exterior of the trench portions.

At block 906, piping may then be installed in the connected trench portions. The piping may be in contact with one or more pipe clips located on an interior lower surface of each trench portion.

At block 908, a lid corresponding to each of the trench portions may then be placed on the trench portions. The lids may be removably coupled to the trench portions by, for example, corrosion resistant screws, clips, tongue-in-groove fasteners, clamps, etc. In other examples, the weight of the lids may be sufficient to arrest unwanted movement of the lids. All or some of the lids may contain a leak detector, which may include a float positioned in a lower half of the trench portion, a helical shaft coupled to the float, and an indicator compartment coupled to the helical shaft and the lid. The leak detectors may include components such as those disclosed in the systems herein. By so doing, the piping system may be installed without the need for dirt or other material to bury the piping and without the need to cover the dirt with decking material (e.g., concrete, tiling, etc.).

Exemplary Method of Leak Detection

Figure 10:
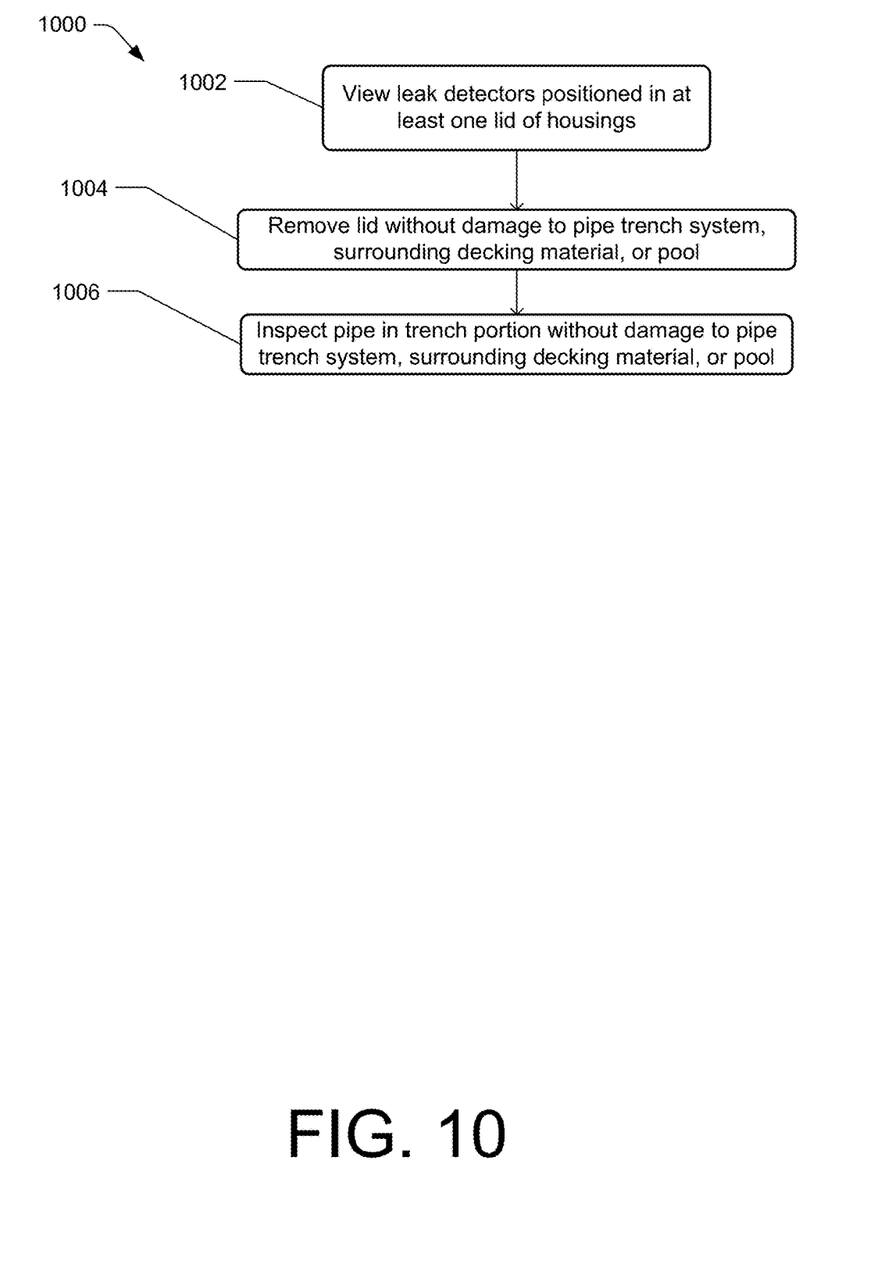
FIG. 10 illustrates a flow diagram of a method of detecting leaks in an embodiment of a pipe trench system.

FIG. 10 illustrates an example method for detecting a leak in a piping system. Method 1000 is illustrated as a logical flow graph. The order in which the operations or steps are described is not intended to be construed as a limitation, and any number of the described operations may be combined in any order and/or in parallel to implement method 1000.

Turning now to FIG. 10, there is illustrated an exemplary method 1000 of detecting a leak in a piping system.

At block 1002, method 1000 includes viewing one or more leak detectors positioned in at least one lid of one or more housings representing a pipe trench system when coupled together. The leak detectors may include components similar to those described herein. For example, the leak detectors may include a float positioned in a lower half of a trench portion of the housings, a helical shaft coupled to the float, and an indicator compartment coupled to the helical shaft and the lid. The indicator compartment may include a viewing portion having a first side that may be substantially transparent and a second side that may be substantially opaque. The indicator compartment may further include a rotatable dial with a first portion that provides a visual indication that a threshold amount of water is present within the housing and a second portion that provides a visual indication that a threshold amount of water is not present within the housing. The rotatable dial may be in contact with the helical shaft such that, as water fills the interior bottom portion of the trench portion, the float is pushed upward and rotates the helical shaft. The rotatable dial rotates with the helical shaft such that the first portion of the rotatable dial becomes visible through the first side of the viewing portion of the indicator compartment.

At block 1004, the method 1000 of detecting a leak may include removing the lid corresponding to the section(s) where the leak detector indicates a leak. The lid may be removed without damage to the pipe trench system, surrounding decking material, or pool.

At block 1006, the method 1000 may include visually inspecting pipes within the trench portion without the need for excavation of dirt or other material and without damage to the pipe trench system, surrounding decking material, or pool. By so doing, leaks may be detected in the piping system in a low-cost, accurate manner without damaging the system or its surroundings.

Exemplary Method of Pipe Repair

Figure 11:
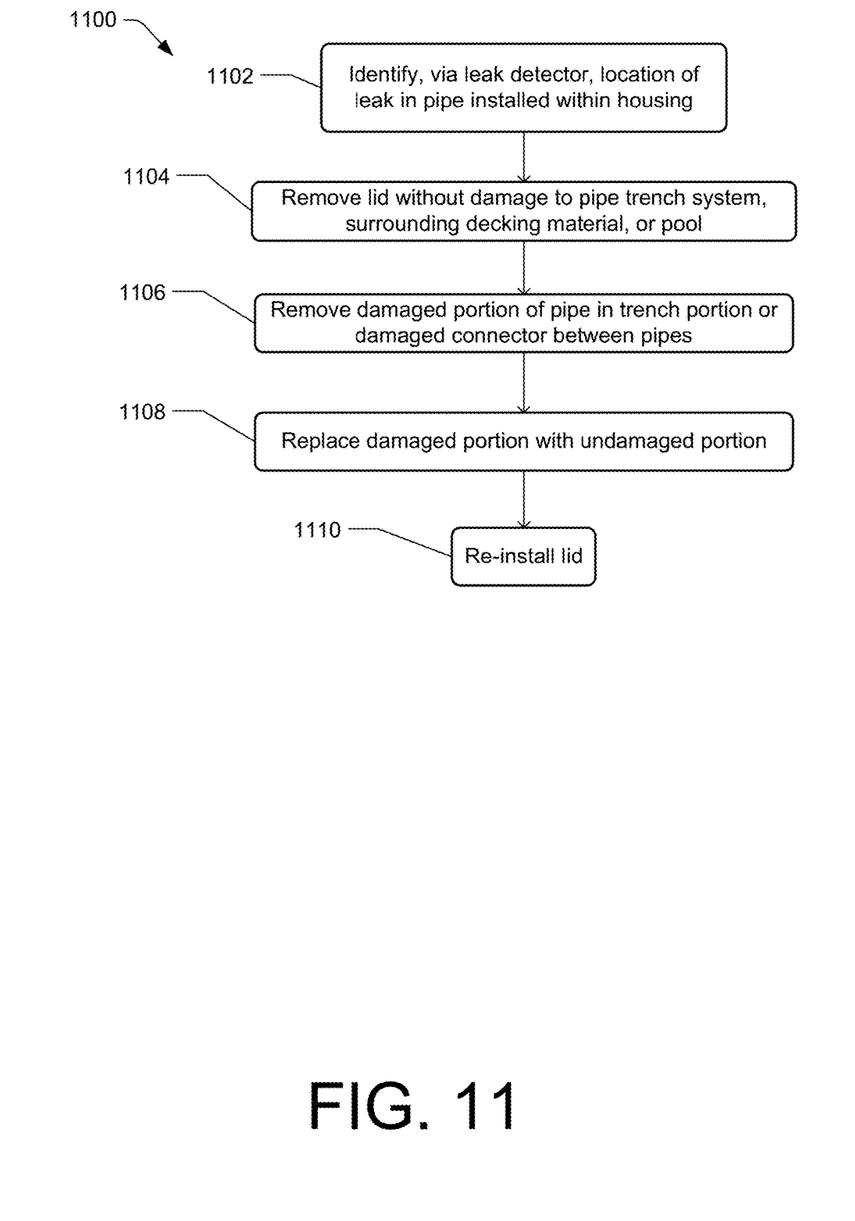
FIG. 11 illustrates a flow diagram of a method of repairing an embodiment of a pipe trench system.

FIG. 11 illustrates an example method for installation of a piping system. Method 1100 is illustrated as a logical flow graph. The order in which the operations or steps are described is not intended to be construed as a limitation, and any number of the described operations may be combined in any order and/or in parallel to implement method 1100.

Turning now to FIG. 11, there is illustrated an exemplary method 1100 of repairing and/or replacing a pipe in a piping system.

At block 1102, method 1100 includes identifying a location of a leak in at least one pipe installed within at least one housing. Identifying the location of the leak may include visually viewing one or more leak detectors positioned in at least one lid of the at least one housing. The one or more leak detectors may include a float positioned in a lower half of a trench portion of the housings, a helical shaft coupled to the float, and an indicator compartment coupled to the helical shaft and the lid. The indicator compartment may include a viewing portion having a first side that may be substantially transparent and a second side that may be substantially opaque. The indicator compartment may further include a rotatable dial with a first portion that provides a visual indication that a threshold amount of water is present within the housing and a second portion that provides a visual indication that a threshold amount of water is not present within the housing. The rotatable dial may be in contact with the helical shaft such that, as water fills the interior bottom portion of the trench portion, the float is pushed upward and rotates the helical shaft. The rotatable dial rotates with the helical shaft such that the first portion of the rotatable dial becomes visible through the first side of the viewing portion of the indicator compartment.

At block 1104, method 1100 may include removing the lid from the trench portion without damage to the pipe trench system, decking material, or pool. Removal of the lid may be accomplished by lifting the lid from the trench portion when no fastening means are used to secure the lid to the trench portion. In other examples, the lid by be removed by unscrewing corrosion resistant screws or otherwise unfastening the lid from the trench portion.

At block 1106, method 1100 may include removing a damaged portion of the pipe within the trench portion or a damaged connector between pipes. In examples, no or minimal fill dirt is present within the trench portion such that, when the lid is removed, the pipe can be visually inspected without the need for excavation of materials from the trench portion. In examples, the need for removing a portion of the pipe or a connector is due to damage, but in other examples, removal may be for regular maintenance or reasons other than damage to the pipe.

At block 1108, method 110 may include replacing the damaged portion of the pipe with an undamaged portion. Replacement of the damaged pipe may be accomplished through means known to those skilled in the art of pipe fitting.

At block 1110, method 1100 may include re-installing the lid on the trench portion with, for example, corrosion resistant screws, clips, tongue-in-groove fasteners, clamps, etc. By so doing, leaking pipes and/or connections can be repaired without the need to excavate dirt/rock, demolish concrete or other decking material, refill trenches, or repave/replace decking materials.

CONCLUSION

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A pipe trench system, the pipe trench system comprising:
   a housing including:
      a trench portion, the trench portion being elongated in a horizontal direction and being configured to be arranged adjacent to a body of liquid; and
      a lid shaped to cover the trench portion, the lid being configured to be arranged adjacent to the body of liquid;
   a pipe clip positioned in the trench portion to cradle at least a pipe connectable to the body of liquid;
   a gasket positioned between at least a portion of the lid and at least a portion of the trench portion, the gasket further positioned to provide a substantially watertight seal between the lid and trench portion such that standing liquid is substantially absent in the trench portion until occurrence of a leak event of the pipe; and
   a leak detector for detecting the leak event and positioned at least partially in the lid, the leak detector including:
      a float positioned in a lower half of the trench portion;
      a helical shaft coupled to the float; and
      an indicator compartment coupled to the helical shaft and the indicator compartment directly coupled to the lid.

2. The system of claim 1, the indicator compartment comprising:
   a viewing portion having a first side and a second side, the first side being substantially transparent, the second side being substantially opaque; and
   a rotatable dial in contact with the helical shaft, the rotatable dial having a first portion that provides a visual indication, when viewed through the first side of the viewing portion, that at least a threshold amount of liquid is present within the housing and a second portion that provides a visual indication, when viewed through the first side of the viewing portion, that the at least the threshold amount of liquid is not present within the housing.

3. The system of claim 2, wherein the visual indication that the at least the threshold amount of liquid is present includes at least one of a word or a symbol indicating that the at least the threshold amount of liquid is present, and wherein the visual indication that the at least the threshold amount of liquid is not present includes at least one of a word or a symbol indicating that the at least the threshold amount of liquid is not present.

4. The system of claim 2, wherein the visual indication that the at least the threshold amount of liquid is present includes a first color, and wherein the visual indication that the at least the threshold amount of liquid is not present includes a second color.

5. The system of claim 2, further comprising a stop notch configured to restrict rotation of the rotatable dial when the first portion is viewable through the first side of the viewing portion.

6. The system of claim 2, wherein the leak detector further comprises:
   a sensor configured to detect when the at least the threshold amount of liquid is present; and
   a transceiver in electronic communication with the sensor and configured to receive a signal from the sensor and transmit data representing a notification to a computing device, the notification indicating that the at least the threshold amount of liquid is present.

7. A pipe trench system, comprising:
   a plurality of housings, individual ones of the plurality of housings including:
      a trench portion being elongated in a horizontal direction and being configured to be arranged adjacent to a body of liquid; and
      a lid shaped to cover the trench portion, the lid being configured to be arranged adjacent to the body of liquid;
   a pipe clip positioned in the trench portion, the pipe clip configured to cradle at least one pipe connectable to the body of liquid;

a gasket positioned between at least a portion of the lid and at least a portion of the trench portion, the gasket further positioned to provide a substantially liquid-tight seal between the lid and trench portion such that standing liquid is substantially absent in the trench portion until occurrence of a leak event of the pipe; and at least one pipe leak detector positioned at least partially in at least one of the lids, the at least one pipe leak detector including an indicator compartment positioned at least partially in the at least one of the lids.

8. The system of claim 7, wherein the trench portion includes an interior lower surface being at least partially curved.

9. The system of claim 7, wherein the trench portion is approximately 10 inches to approximately 20 inches from the lid to an interior lower surface of the trench portion.

10. The system of claim 7, individual ones of the plurality of housings further comprising:
a ledge on the trench portion, the ledge configured to include the gasket and receive the lid.

11. The system of claim 7, wherein at least one housing of the plurality of housings is at least partially bent, at least one housing of the plurality of housings includes a three-way junction, and at least one housing of the plurality of housings includes a four-way junction.

12. The system of claim 7, wherein the plurality of housings are configured to couple to each other.

13. The system of claim 7, wherein the pipe clip is positioned on an interior lower surface of individual ones of the plurality of housings, the pipe clip sized to conform to the interior lower surface of the individual ones of the plurality of housings and to cradle at least one pipe situated within the individual ones of the plurality of housings.

14. The system of claim 13, wherein the pipe clip is a first pipe clip, and wherein the system further comprises a second pipe clip positioned between a first layer of pipe and a second layer of pipe within individual ones of the plurality of housings, the second pipe clip sized to cradle first pipes of the first layer of pipe and second pipes of the second layer of pipe.

15. The system of claim 7, wherein the plurality of housings are configured to couple to each other and the plurality of housings define a piping system for the body of liquid.

16. A pipe trench system, comprising:
a housing including:
a trench portion, the trench portion being elongated in a horizontal direction and being configured to be arranged adjacent to the body of liquid; and
a lid shaped to cover the trench portion, the lid being configured to be arranged adjacent to the body of liquid and including a pan;
a pipe clip positioned in the trench portion to cradle at least a pipe connectable to the body of liquid;
a gasket positioned between at least a portion of the lid and at least a portion of the trench portion, the gasket further positioned to provide a substantially liquid-tight seal between the lid and the trench portion such that standing liquid is substantially absent in the trench portion until occurrence of a leak event of the pipe; and
a leak detector for detecting the leak event and positioned in at least a portion of the lid, the leak detector including:
a float positioned in a lower half of the trench portion;
a helical shaft coupled to the float; and
an indicator compartment coupled to the helical shaft and the indicator compartment directly coupled to the lid.

17. The system of claim 16, wherein the pan is at least partially filled with a material including concrete.

18. The system of claim 16, wherein the pan is at least partially filled with at least one of polymeric resin or ceramic.

19. The system of claim 16, wherein the trench portion is approximately 10 inches to approximately 20 inches from the lid to an interior lower surface of the trench portion.

20. The system of claim 16, further comprising a transceiver configured to transmit data representing a notification to a computing device, the notification indicating that at least a threshold amount of liquid is present in the housing.

* * * * *